United States Patent
Pennington et al.

(10) Patent No.: US 9,852,631 B2
(45) Date of Patent: Dec. 26, 2017

(54) MOBILE ON-STREET PARKING OCCUPANCY DETECTION

(71) Applicant: Xerox Corporation, Norwalk, CT (US)

(72) Inventors: Graham Pennington, Webster, NY (US); Hao Wu, Pittsford, NY (US); Howard Mizes, Pittsford, NY (US); Wencheng Wu, Rochester, NY (US); Rakesh Kulkarni, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 58 days.

(21) Appl. No.: 15/060,830

(22) Filed: Mar. 4, 2016

(65) Prior Publication Data
US 2017/0256165 A1 Sep. 7, 2017

(51) Int. Cl.
*B60Q 1/48* (2006.01)
*G08G 1/14* (2006.01)
*G06K 9/00* (2006.01)

(52) U.S. Cl.
CPC ......... *G08G 1/147* (2013.01); *G06K 9/00812* (2013.01); *G08G 1/144* (2013.01)

(58) Field of Classification Search
CPC ..... G08G 1/147; G08G 1/144; G06K 9/00812
USPC .............................................. 340/932.32, 933
See application file for complete search history.

(56) References Cited

U.S. PATENT DOCUMENTS

| | | | |
|---|---|---|---|
| 6,285,297 B1* | 9/2001 | Ball | G08G 1/14 340/932.2 |
| 6,340,935 B1 | 1/2002 | Hall | |
| 2009/0179776 A1 | 7/2009 | Holden | |
| 2009/0315738 A1* | 12/2009 | Falk | G08G 1/0175 340/932.2 |
| 2011/0063097 A1 | 3/2011 | Naka et al. | |
| 2012/0299749 A1* | 11/2012 | Xiao | G08G 1/04 340/932.2 |
| 2014/0210646 A1* | 7/2014 | Subramanya | B61L 29/28 340/928 |
| 2014/0266803 A1* | 9/2014 | Bulan | G06K 9/00785 340/932.2 |
| 2015/0235148 A1* | 8/2015 | Chen | G06Q 20/14 705/5 |
| 2015/0242695 A1 | 8/2015 | Fan et al. | |
| 2016/0125246 A1* | 5/2016 | Ryhorchuk | H04N 19/30 348/143 |

(Continued)

OTHER PUBLICATIONS

U.S. Appl. No. 15/058,660, filed Mar. 2, 2016, Wu et al.
U.S. Appl. No. 14/805,608, filed Jul. 22, 2015, Wu et al.
U.S. Appl. No. 14/502,045, filed Sep. 30, 2014, Wu et al.

*Primary Examiner* — Ojiako Nwugo
(74) *Attorney, Agent, or Firm* — Kevin Soules; Kermit D. Lopez; Luis M. Ortiz

(57) ABSTRACT

A method, system, and apparatus for parking occupancy detection comprises collecting video of a blockface with at least one video recording module, identifying a number of possible parking spaces along the blockface in the collected video, defining, a region of interest for each of the possible parking spaces, detecting a time dependent occupancy of the defined regions of interest for each of the possible parking spaces, and reporting the time dependent occupancy. Drift correction of the recorded video and ground truth comparisons of occupancy determinations may be provided.

18 Claims, 12 Drawing Sheets

(56) References Cited

U.S. PATENT DOCUMENTS

2016/0379496 A1* 12/2016 Cho ..................... G07C 1/30
                                                              705/40

* cited by examiner

| TIME | \_\_\_\_\_ PARKING SPOT INDEX \_\_\_\_\_ | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 3/16/2015 5:59 | 0.64 | 0.89 | 0.72 | 0.84 | 0.83 | 0.87 | 0.24 | 0.19 | 0.39 | -1.00 | -1.00 | -1.00 | -1.00 | -1.00 | -1.00 | -1.00 | -1.00 | -1.00 |
| 3/16/2015 6:00 | 0.50 | 0.88 | 0.73 | 0.84 | 0.82 | 0.86 | 0.24 | 0.19 | 0.32 | -1.00 | -1.00 | -1.00 | -1.00 | -1.00 | -1.00 | -1.00 | -1.00 | -1.00 |
| 3/16/2015 6:01 | 0.46 | 0.88 | 0.71 | 0.84 | 0.82 | 0.86 | 0.24 | 0.18 | 0.31 | -1.00 | -1.00 | -1.00 | -1.00 | -1.00 | -1.00 | -1.00 | -1.00 | -1.00 |
| 3/16/2015 6:02 | 0.50 | 0.88 | 0.73 | 0.84 | 0.82 | 0.87 | 0.24 | 0.18 | 0.30 | -1.00 | -1.00 | -1.00 | -1.00 | -1.00 | -1.00 | -1.00 | -1.00 | -1.00 |
| 3/16/2015 6:03 | 0.51 | 0.88 | 0.73 | 0.84 | 0.82 | 0.87 | 0.22 | 0.18 | 0.31 | -1.00 | -1.00 | -1.00 | -1.00 | -1.00 | -1.00 | -1.00 | -1.00 | -1.00 |
| 3/16/2015 6:04 | 0.51 | 0.88 | 0.73 | 0.85 | 0.82 | 0.87 | 0.20 | 0.18 | 0.30 | -1.00 | -1.00 | -1.00 | -1.00 | -1.00 | -1.00 | -1.00 | -1.00 | -1.00 |
| 3/16/2015 6:05 | 0.53 | 0.87 | 0.73 | 0.84 | 0.80 | 0.87 | 0.21 | 0.17 | 0.30 | 0.16 | 0.18 | 0.43 | 0.82 | 0.68 | 0.70 | 0.37 | 0.31 | 0.21 |
| 3/16/2015 6:06 | 0.53 | 0.87 | 0.75 | 0.83 | 0.80 | 0.87 | 0.22 | 0.18 | 0.29 | 0.16 | 0.20 | 0.43 | 0.83 | 0.67 | 0.69 | 0.38 | 0.29 | 0.23 |
| 3/16/2015 6:06 | 0.53 | 0.87 | 0.75 | 0.83 | 0.80 | 0.87 | 0.21 | 0.18 | 0.28 | 0.16 | 0.21 | 0.43 | 0.82 | 0.66 | 0.70 | 0.39 | 0.28 | 0.24 |
| 3/16/2015 6:07 | 0.53 | 0.87 | 0.75 | 0.83 | 0.81 | 0.85 | 0.21 | 0.18 | 0.28 | 0.15 | 0.21 | 0.45 | 0.83 | 0.68 | 0.70 | 0.43 | 0.39 | 0.33 |

FIG. 11

MOBILE ON-STREET PARKING OCCUPANCY DETECTION

FIELD OF THE INVENTION

Embodiments are generally related to the field of imaging. Embodiments are also related to the field of cameras and data capture. Embodiments are further related to methods and systems for correcting camera drift. Embodiments are also related to on-street parking occupancy detection.

BACKGROUND

Smart parking management plays an important role in Smart City technology. Smart parking management can reduce traffic congestion. Video sensing is an aspect of smart parking technology that enables more flexible as well as extensible solutions, compared to in-ground metal sensors or ultrasonic sensors.

Smart parking management also plays a role in Smart City technology because smart parking management can reduce traffic congestion due to drivers circling to find parking spaces. Such prior art methods such as in-ground sensors and ultrasonic sensors are expensive and error prone. Accordingly, there is a need in the art for mobile video based, parking occupancy detection as described herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for a method and system for video collection.

It is another aspect of the disclosed embodiments to provide for a method and system for parking occupancy detection.

It is another aspect of the disclosed embodiments to provide for a method and system for drift correction, in video associated with smart parking applications.

It is yet another aspect of the disclosed embodiments to provide for an enhanced method and system for mobile on-street parking occupancy detection with drift correction features.

The aforementioned aspects and other objectives and advantages can now be achieved as described herein. A method, system, and apparatus for parking occupancy detection comprises collecting video of a blockface with at least one video recording module, identifying a number of possible parking spaces along the blockface in the collected video, defining a region of interest for each of the possible parking spaces, detecting a time dependent occupancy of the defined regions of interest for each of the possible parking spaces, and reporting the time dependent occupancy. Drift correction of the recorded video and ground truth comparisons of occupancy determinations may be provided.

A method for parking occupancy detection comprises identifying an optimal location for the at least one video recording module; configuring the at least one video recording module in the optimal location; adjusting the at least one video recording module to optimally observe the blockface; indexing the possible parking spaces along the blockface; collecting video of a blockface with at least one video recording module; identifying a number of possible parking spaces along the blockface in the collected video; defining a region of interest for each of the possible parking spaces; detecting a time dependent occupancy of the defined regions of interest for each of the possible parking spaces; performing a ground truth detection in order to collect a true occupancy of the possible parking spaces; merging the time dependent occupancies from the multiple cameras observing each blockface; and reporting the time dependent occupancy.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 11 depicts an exemplary output of occupancy results for a blockface in accordance with aspects of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
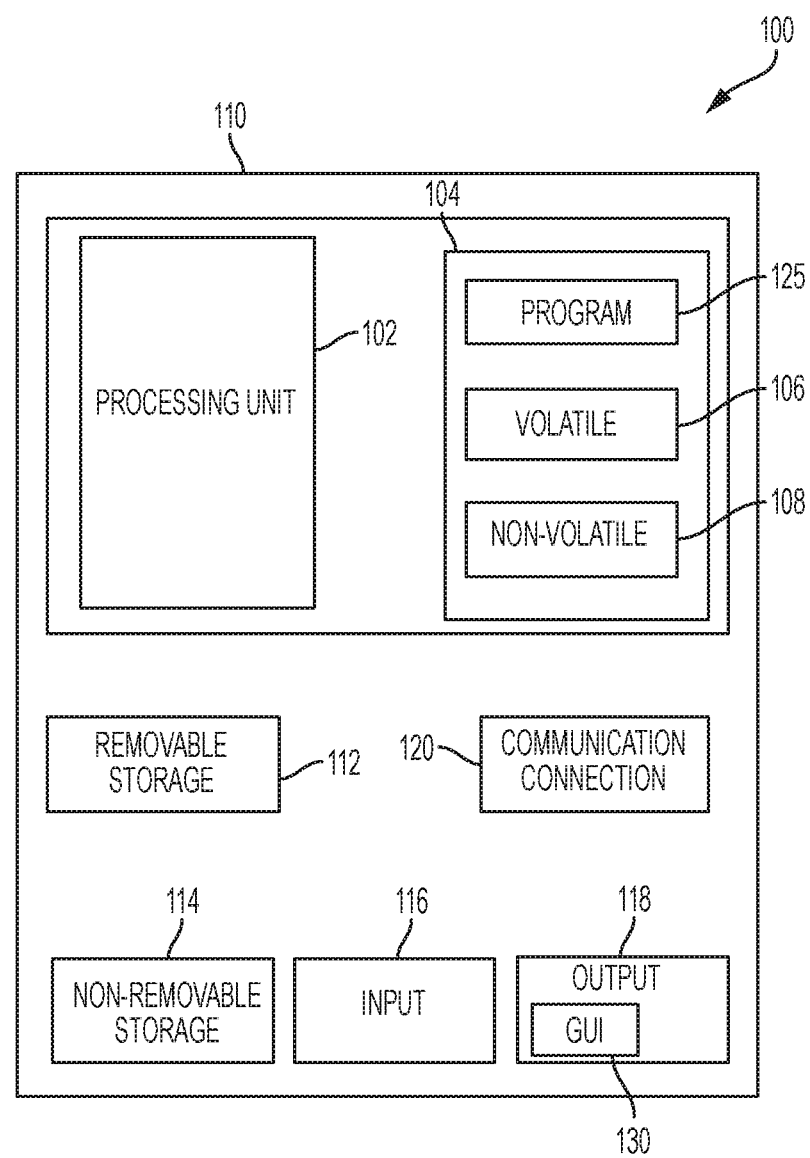
FIG. 1 depicts a block diagram of a computer system which is implemented in accordance with the disclosed embodiments.
Figure 2:
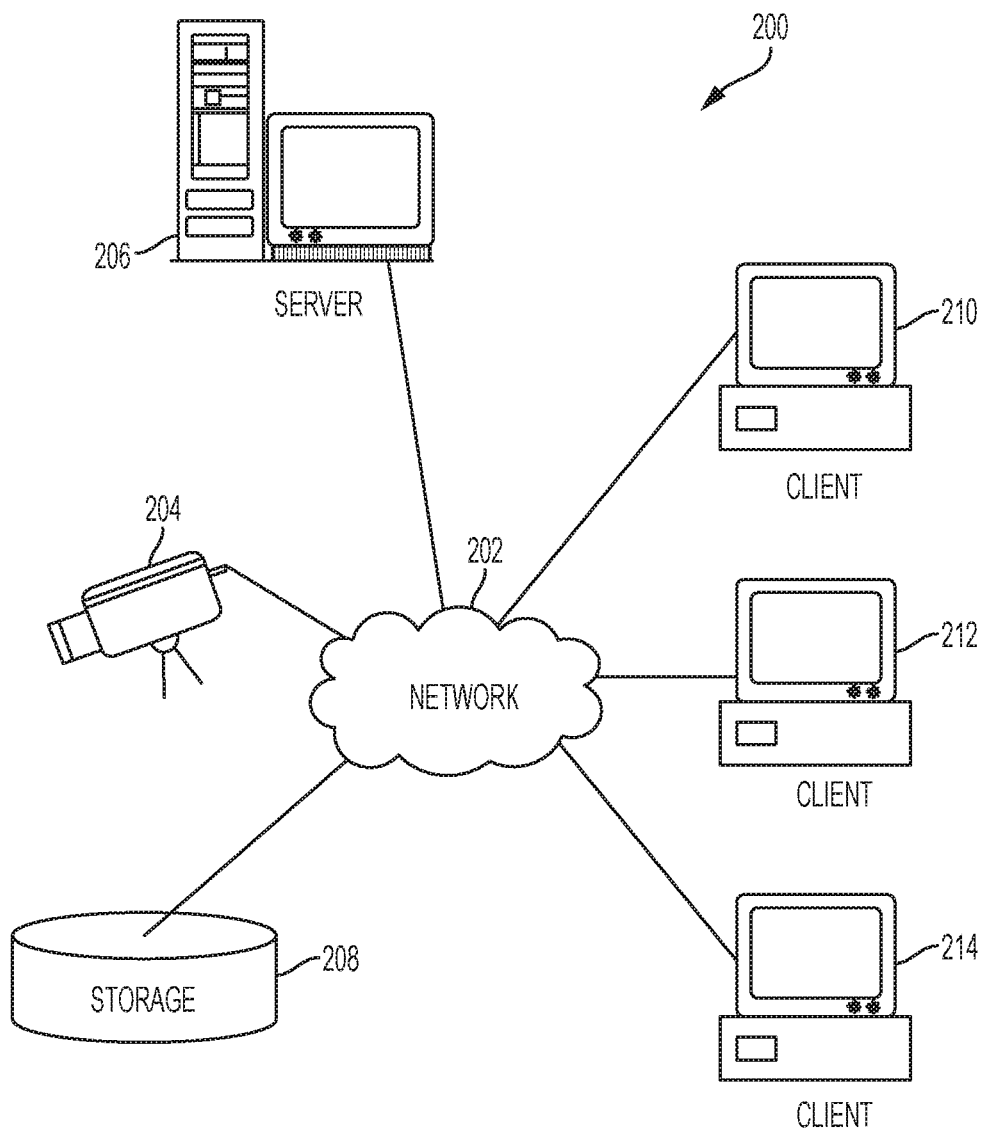
FIG. 2 depicts a graphical representation of a network of data-processing devices in which aspects of the present invention may be implemented.
Figure 3:
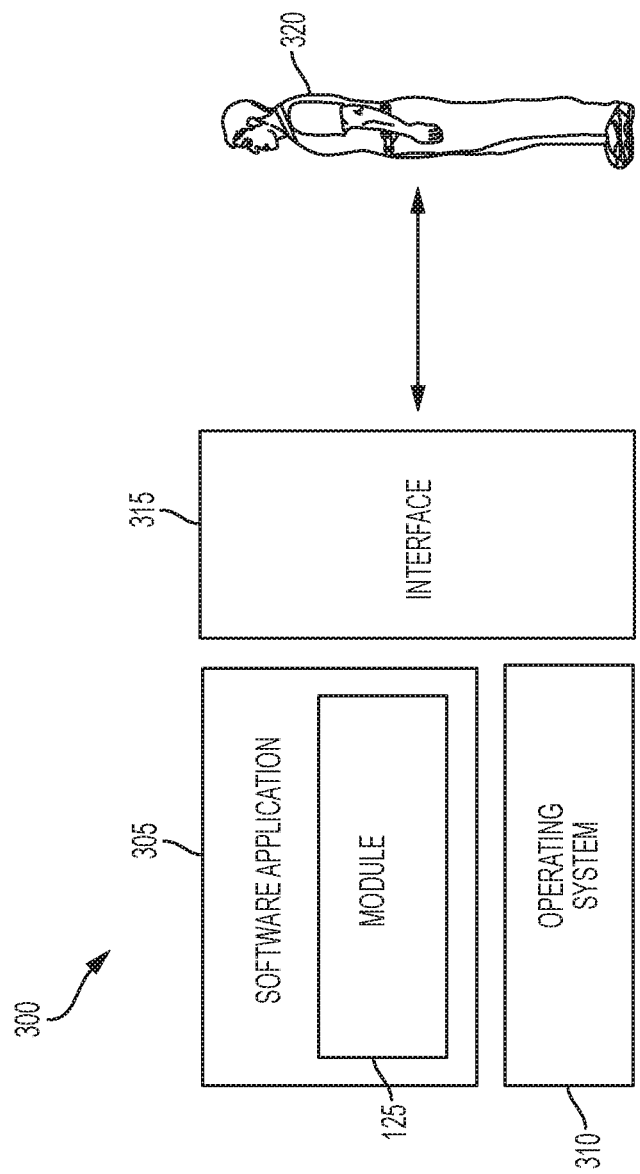
FIG. 3 illustrates a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as video camera 204, and a memory storage unit such as, for example, memory or database 208.

In the depicted example, video camera 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively, clients 210, 212, and 214 may also be, for example, a photographic camera, video camera, tracking device, sensor, etc.

Computer system 100 can also be implemented as a server such as server 206, depending upon design considerations. In the depicted example, server 206 provides data such as boot files, operating system images, applications, and application updates to clients 210, 212, and 214, and/or to video camera 204. Clients 210, 212, and 214 and video camera 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

A method and system for transforming raw video data to accurate time dependent parking spot occupancy counts is disclosed herein. Embodiments include a trailer configured with a camera. It should be understood that the camera may be configured as one or more cameras. The word "camera" or "video camera" as used herein should be understood to mean at least one camera. A prioritized trailer placement location and camera alignment procedure can be used to obtain good video for computer vision based occupancy detection. Video is captured for a predetermined period of time. This may be combined with a procedure to transfer video to a server or directly feed video to a remote server. Parking spots along a given block face in the video can be indexed. Drift correction steps may be necessary to mitigate camera movement due to motion from mast vibration and thermal expansion and contraction. A region of interest can be identified matching parking spots to regions in the captured video. A computer vision detection algorithm is used to assign a confidence to a parking spot being occupied. Overlapping views of the blockface from multiple cameras can be merged. An optional ground truth measurement technique can be applied to collect the true occupancy information needed to optimize computer vision algorithm parameters. Finally, a results reporting format that best communicates the occupancy results to a demand algorithm, city parking authorities, or other such end users is provided.

Figure 4:
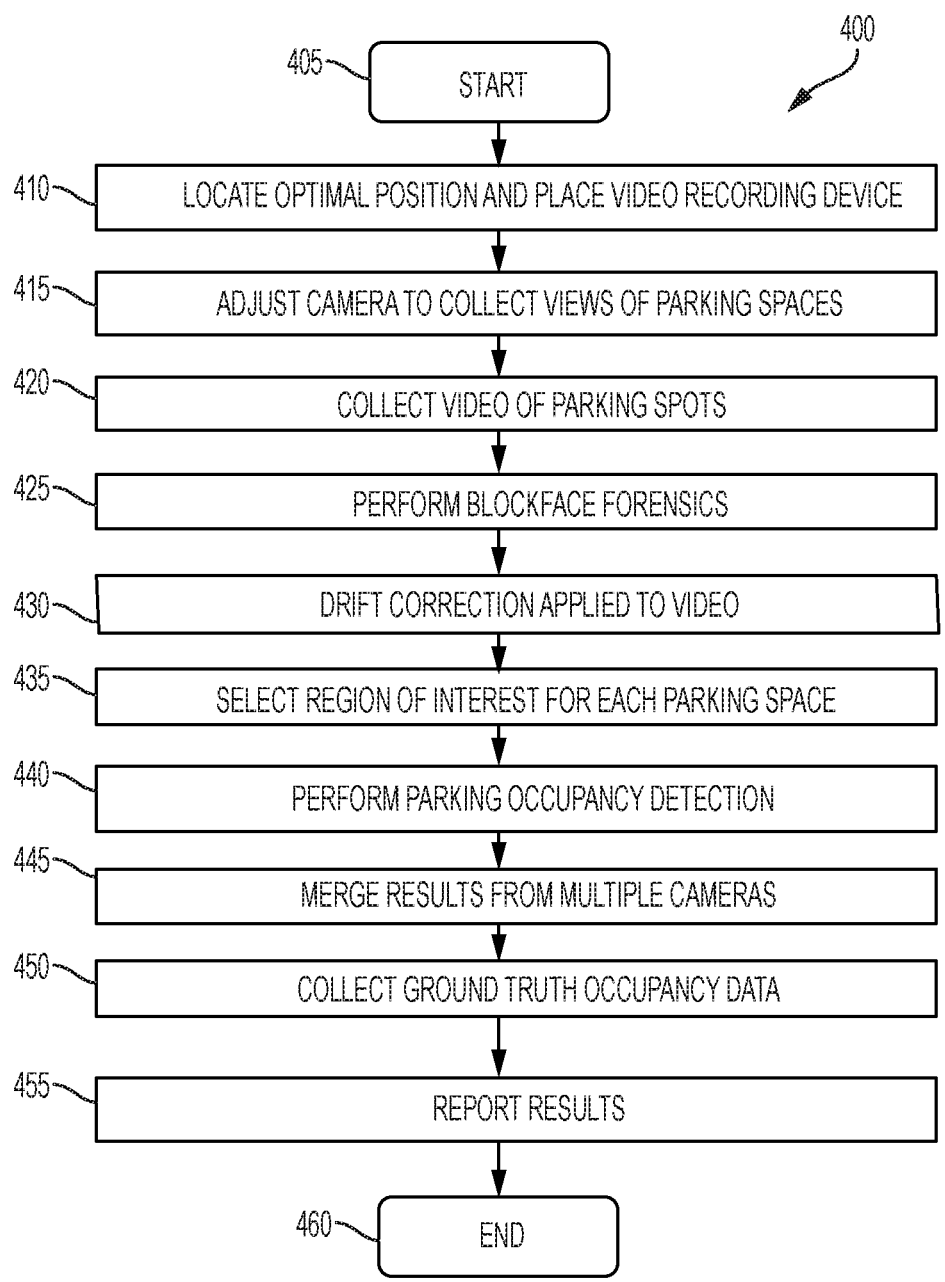
FIG. 4 depicts a flow chart illustrating steps for detecting parking occupancy in accordance with the disclosed embodiments.

FIG. 4 illustrates one embodiment comprising a method 400 of steps for mobile parking occupancy detection. The method can be used to transform raw video data into accurate time dependent parking stall occupancy. The method begins at step 405.

Step 410 involves identifying an available and optimal position for observing a blockface of interest and placing a video recording device at that location. Preferable locations include locations where the views of the parking regions are not occluded by plant life, buildings, vehicles, etc. Preferable locations are also locations where a trailer will not inhibit traffic or pedestrian flow. Preferable locations are generally locations across from a blockface of interest that provide a clear view of as much of the blockface as possible.

Figure 5:
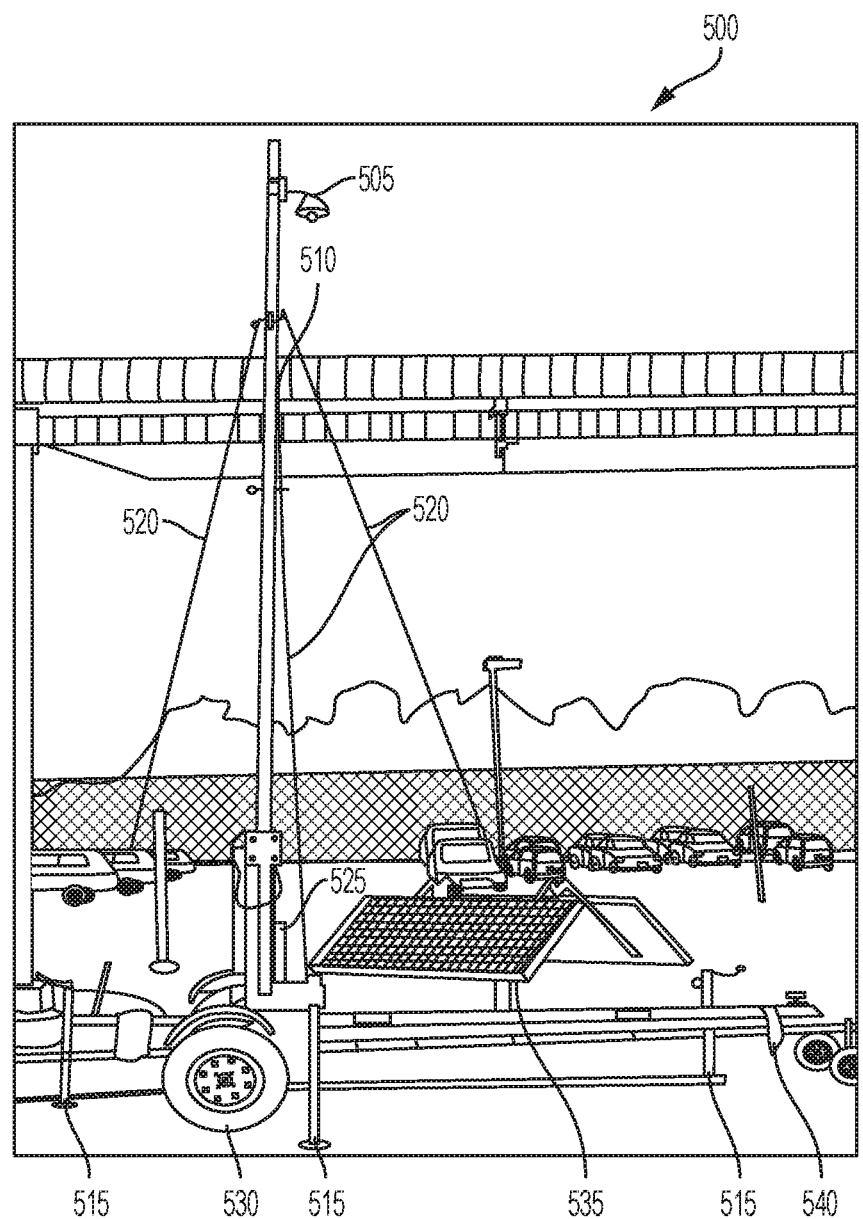
FIG. 5 depicts a camera trailer for mobile video collection in accordance with the disclosed embodiments.

A trailer can be placed at a selected location. In an embodiment, the trailer can be a camera trailer 500 as illustrated in FIG. 5. The camera trailer 500 includes at least one camera 505 attached to a mast 510. The height of the camera 505 can be adjusted with mast pump 525. The mast pump 525 can adjust the horizontal to vertical orientation of the mast. The trailer includes a hitch 540 that connects to a vehicle and wheels 530 so that the trailer can be towed into position. Once in place, a plurality of stabilizers 515 can be used to minimize extraneous movement of the trailer. Guide wires 520 can be used to indirectly reduce movement of mast 510, and thus the movement of the camera 505. The camera mounting bracket further directly reduces the movement of the camera 505. Solar collectors 535 can be affixed to the trailer and provide power to camera 505 such that no external power sources are required.

FIG. 5 illustrates one embodiment of a trailer that may be used in connection with the methods and systems disclosed herein. It should be appreciated that other mobile video collecting systems might alternatively or additionally be used. Also, the camera 505 could be attached to a permanent object with a view of the blockface of interest, including light poles, traffic lights, and buildings. In addition, video could also be provided from permanent or semi-permanent video cameras already in a location. Such cameras might include surveillance cameras, traffic light cameras, or other such cameras that collect a view of a parking area.

Returning to FIG. 4, at step 415 the camera can be adjusted to best capture views of parking spots within the video camera field of view. Video of the blockface can next be collected, at step 420, for a predetermined period of time. The collected video can be later transferred to a server or directly fed to a remote server. In other embodiments, the software modules associated with the system described herein may be provided in a computing system such as computing system 100 associated with a camera such as camera 505, such that the video processing is conducted on-board of said camera.

At step 425, blockface forensics are performed to index each available parking space along a blockface and match the parking space to the viewable parking spaces from each camera. At step 430, drift correction may be applied to compensate for mast motion or other such camera movement.

Based on the blockface forensics described at step 425, a region of interest for each parking spot can be selected at step 435. At this point, parking occupancy detection can be performed using computer vision techniques as shown at step 440.

In situations where results from multiple cameras overlap for a given portion of the video images, the occupancy results can be merged as shown at step 445. Ground truth measurement techniques may be optionally applied to collect the true occupancy information needed to optimize the computer vision algorithm parameters, as illustrated at step 450. Note that various sampling schemes can be applied to the ground truth measurement techniques to best utilize the manual efforts. For example, the ground truth measurement may be conducted to a fraction (e.g., 10%) of the sampling used in the parking occupancy detection. In another example, the ground truth measurement may be conducted to a first fraction (e.g., 1%) of the sampling used in the parking occupancy detection. This first set of ground truth measurements can then be used to assess the accuracy of the parking occupancy detection for that particular view/site. If the accuracy is desirable (e.g., 90% or higher), no more ground truth measurement is needed. If not, the first set of ground truth measurements may be used to optimize the parking occupancy detection for that particular view/site. Once optimized, the ground truth measurements may be conducted to an additional fraction (e.g., 1%) of the sampling used in the parking occupancy detection. The process may be repeated until the total fraction of ground truth measurements exceeds a pre-determined level (e.g., 10%). Other ground truth measurement strategies may alternatively be applied to optimize the parking occupancy detection for each particular view/site. Finally, the blockface forensics and the occupancy results for each parking space can be reported to an end user as shown at step 455. The method ends at step 460.

Figure 6:
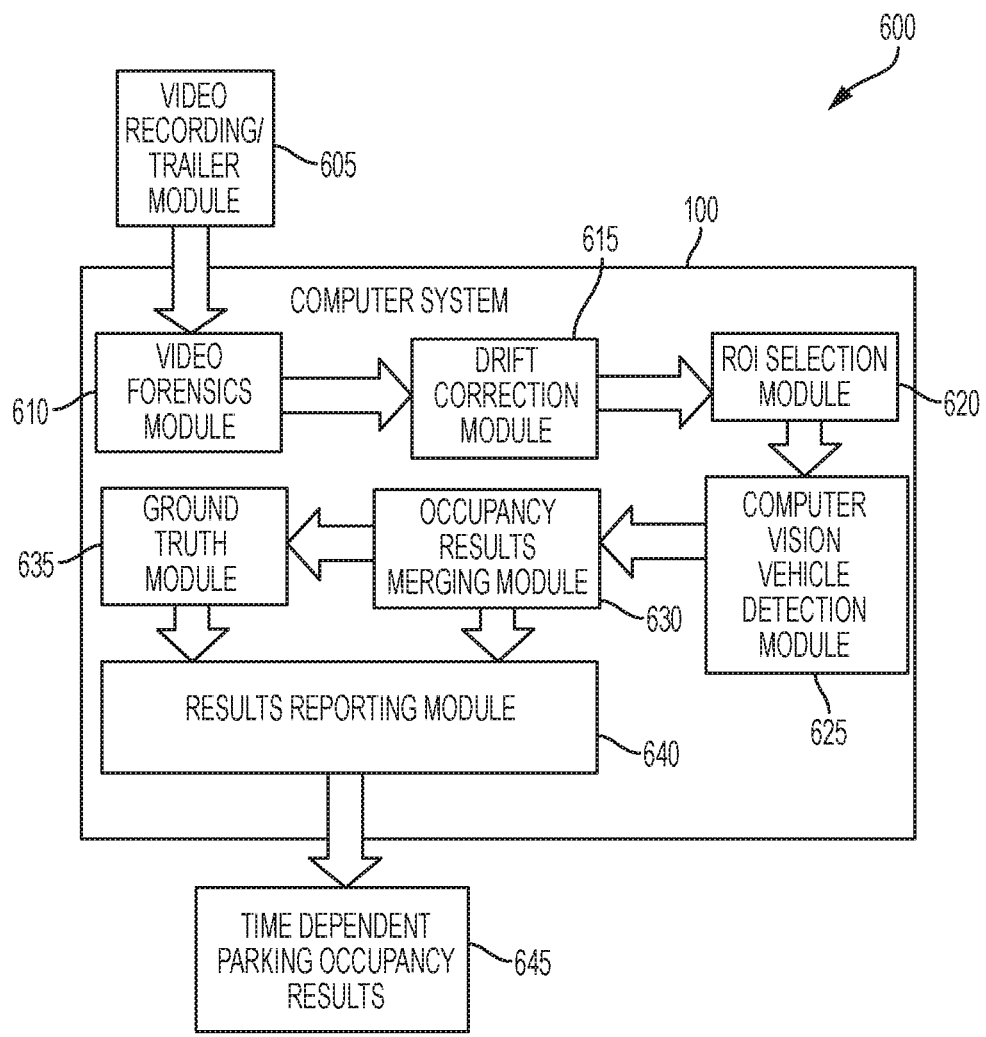
FIG. 6 depicts a block diagram of modules associated with a system and method for detecting parking occupancy in accordance with disclosed embodiments.

FIG. 6 illustrates an exemplary system 600 for parking occupancy detection in accordance with an embodiment. The system 600 includes a video recording/trailer module 605, as illustrated in FIG. 5 that is placed at best available position to observe a blockface of interest. The video recording/trailer module 605 captures videos of a blockface for a predetermined period of time. The data can be transferred to a server or directly fed to a remote server or associated computer system, such as computer system 100.

A video forensics module 610 is used to perform blockface forensics to index each available parking space along the blockface and match the parking space to the viewable parking spaces from each video/trailer module 605. Drift correction is an optional step performed by a drift correction module 615. The drift correction module 615 compensates for motion in the collected video. An ROI selection module 620 is used to select a region of interest for each parking spot based on the blockface forensics from the video forensics module 610. Computer vision based parked vehicle detection within the video can be completed by a computer vision vehicle detection module 625.

In the case where multiple video recording/trailer modules 605 are used to collect video from blockface, an occupancy results merging module 630 merges the occupancy results from multiple cameras. Optionally, a ground truth module 635 provides tools to perform a ground truth measurement technique to collect the true occupancy information needed to optimize computer vision algorithm parameters. It should be appreciated that ground truth measurements may be done with or without the tools provided by ground truth module 635, but that ground truth module 635 may dramatically improve the efficiency of ground truth data collection.

If a ground truth measurement is not required, occupancy results merging module may provide data to a results reporting module 640 which provides a report 645 regarding the blockface forensics and the occupancy results for each parking space. If the ground truth measurement is required, the ground truth module provides parking occupancy results to the results reporting module 640.

Each of the steps in method 400 may be implemented according to modules described in system 800. The method steps may include additional sub steps or details in accordance with the disclosed embodiments.

At step 410, identification of an optimal location and/or placement of a video recording device is described. The video recording device may be connected to a trailer. The trailer is positioned to observe a blockface of interest and the camera, or in some embodiments, multiple cameras, can be adjusted to best capture views of parking spots within the video camera field of view.

A blockface is selected for monitoring based on the need to derive an appropriate on-street parking pricing strategy for the end user. Often times the end user will be a city or other such government entity. Alternatively, the end user might be a business owner, parking authority, etc.

As such, identifying the best location for monitoring is critical. Computer vision detection algorithms are most accurate when occlusions are minimized and there is enough resolution to resolve features of the vehicles that the algorithms have been trained to detect. Therefore, to obtain the most accurate count of cars, the trailer can be placed so that occlusions from nearer parked vehicles minimally occlude the view of adjacent parked vehicles.

In one embodiment, a sequence of prioritized trailer locations can be used to ensure the best view. For blockfaces with a linear distance of less than 300 feet, the trailer should be placed as close to the center of the opposite blockface as possible. In situations where two cameras are provided on a single trailer, one camera should view the desired blockface from the parking spot directly opposite the trailer to, at most, six car lengths to the right. The second camera should view the desired blockface from the parking spot directly opposite the trailer to, at most, six car lengths to the left. If there are more than six parking spaces to the right or to the left of the opposite parking space, a third camera or a fourth camera should be used to view the blockface from the sixth parking space to the last parking space.

For blockfaces of more than approximately 300 feet, two or more trailers should be placed at approximately 300 foot intervals on the side of the street opposite that of the desired blockface. Other interval distances are possible according to the specifications of the camera and the blockface being observed. Each trailer should view its portion of the blockface according to the description in the above paragraph, where cameras view the left portion of the blockface and the right portion of the blockface.

In some cases only the corner of the blockface may be available for trailer placement. In such circumstances, only the right looking cameras or the left looking cameras, depending on the corner, need to be used. If the desired blockface is longer than 150 feet, then another trailer should be deployed on the other corner of the opposite blockface.

Viewing an entire blockface of a block longer than 150 feet from the corner of the opposite blockface, or still even less optimally, from the corner of the blockface on the other side of the cross street should be chosen only when there is no other location available.

In order to monitor occupancy over a large area of a city, many trailers with multiple cameras monitoring a sequence of blockfaces are used and an association of each video with location is needed. In another embodiment, a graphical user interface (GUI) based quality assurance (QA) tool for interactive camera view optimization can be used to associate video from each camera with a corresponding blockface. A GUI-based QA tool can include human-in-the-loop and automated image analysis for image quality measurement, dimensionality measurement, and camera pose estimation, etc.

Figure 7:
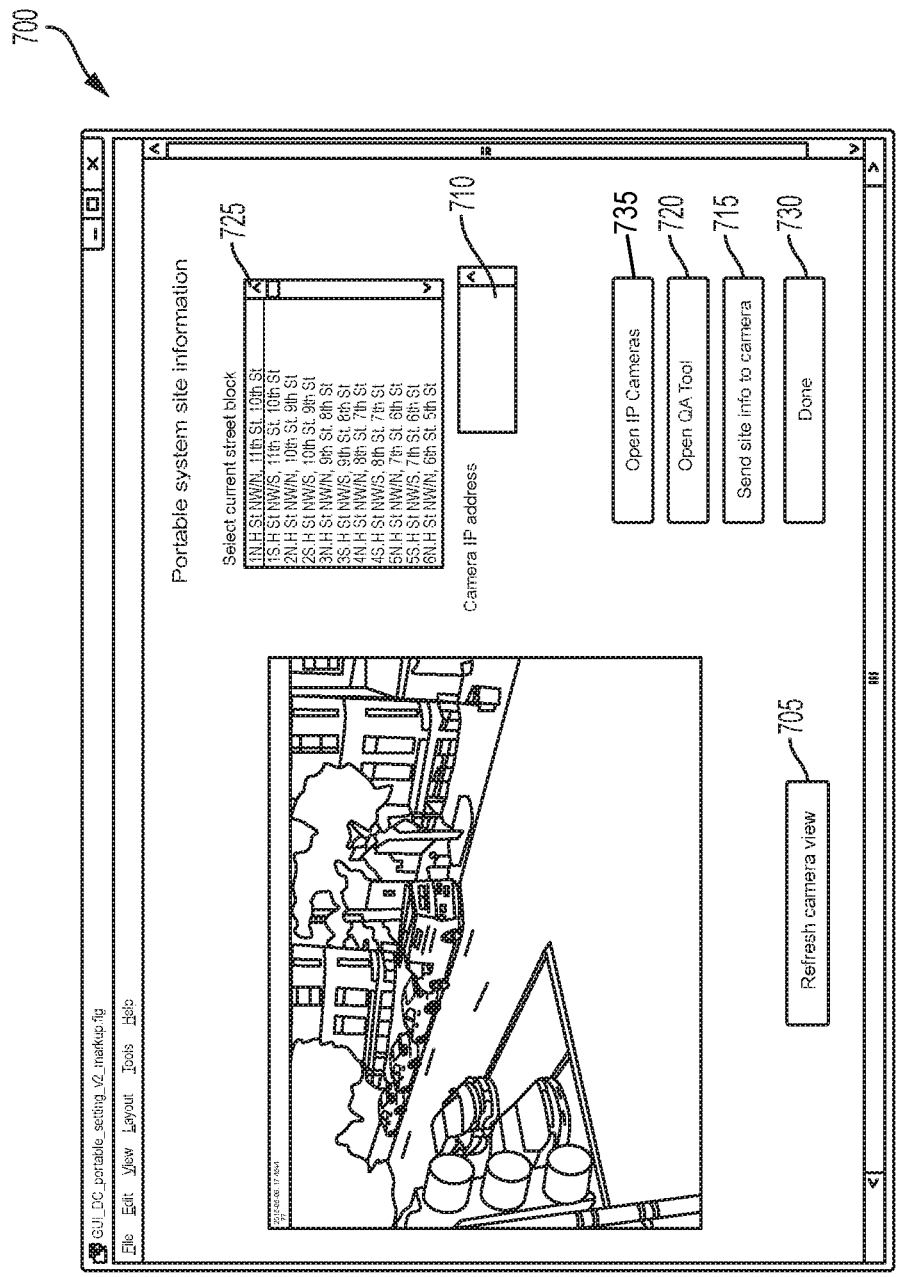
FIG. 7 depicts an exemplary GUI-based QA tool for camera view optimization in accordance with the disclosed embodiments.

For example, FIG. 7 illustrates an exemplary embodiment of a GUI-based QA tool 700 for camera view optimization. The QA tool can provide a number of features. The GUI can include an extraction tool to extract at least one snap-shot of the current camera view using the refresh button 705. The captured frame or frames can then be used for later processing. The tool 700 provides the ability to select or enter the blockface being observed as shown at 725. The tool 700 can display IP addresses in field 710 of active cameras. This may be useful for logging purposes. Button 715 provides the ability to send setup information back to cameras for logging.

The Open QA Tool 720 provides a series of interactive quality assurance checks. For example, the Open QA Tool 720 allows the operator to draw a line along the curb so that an automated image analysis engine can estimate the pose of the camera. If the angle is too steep, poorer performance is yielded. Open QA Tool 720 further allows an operator to draw a box to enclose the farthest vehicle of interest in the view. This allows the automated image analysis engine to estimate the spatial resolution for detecting the most distant vehicle. If the spatial resolution is not fine enough, feedback (such as zoom in the camera field of view) can be given to the operator. Open QA Tool 720 lets the operator draw at least one line segment across the edge of vehicle(s) allowing the automated image analysis engine to determine whether the camera is in focus. Button 735 opens IP cameras and button 730 closes the interface.

It should be understood that several of the QA tools above can be fully automated. However, automated embodiments may be beyond the resources of some users particularly where large robust deployment is expected. As such, human-in-loop implementation may be used. In such cases human guidance is required only at the camera set-up per blockface.

As illustrated at step 420, videos of the blockface can be collected for a predetermined period of time. The video can be later transferred to a server or directly fed to a remote server.

In an embodiment, the cameras can be scheduled to capture and record portions of the blockface for a predetermined (n) number of days. Recording can be continuous for the duration or set to record based on a time schedule (e.g. 6 am-11:30 pm). The frame rate can be set to a fixed number. In an embodiment, this rate may be 5-30 frames/sec, but other frame rates are possible. The frame rate is selected to enable computer vision algorithms that use tracking to aid in parking occupancy detection and/or to apply temporal filtering (e.g., median filtering) across the frames to minimize noise from object motion outside such as traffic in the street that occludes the parking area temporarily.

The frame rate can also be set to slower rates (<1 frame sec) to increase the number of images that can be collected and to reduce power usage. Further reductions in power consumption can be realized by removing power to the cameras during off schedule periods (when the camera is not acquiring video). However, removing power from the camera system can result in a loss of timekeeping, as internal timekeeping devices may also not be powered.

Without accurate time, the camera system will capture video asynchronously. In an embodiment, one solution is to incorporate a GPS-based NTP server to quickly and accurately synchronize time amongst the cameras in the system. Since the cameras are continuously adjusting time based on this signal, very accurate synchronization between cameras is possible. The video from each camera is time stamped either within the file name or by embedding a timestamp in the video.

Video can be stored locally on the camera (for example, on an SD card, networked storage, or other such onboard memory) or can be sent to a remote server via internet connection. When the video is stored locally, it can be swapped out at the time the trailer is moved to another location and downloaded to a server for analysis. The local storage may also be replaced when it is full or just before it is full, in certain embodiments.

Step 425 involves the performance of blockface forensics to index each available parking space along a blockface and match the parking space to the viewable parking spaces from each camera.

In order to assign an occupancy fraction to a blockface, the number of available parking spaces along the blockface must first be determined. Available parking spaces are those sections along the curb where parking is permitted. Such parking spaces may be demarcated or not demarcated. Unavailable parking spaces include, no parking zones, curb adjacent to fire hydrants, loading zones, driveways, etc. Visual cues such as street signs and marks on the pavement can be helpful in determining the bounds of each parking stall when free flow parking conditions exist.

The available parking spaces along a given section of blockface can be determined by electronic or manual review of images of the street. Publically available databases of images of street views are available and useful in this capacity. Alternatively, a video or description of the blockface can be captured at the time of, or before, the trailer is setup. This can be done by taking a video of the location using any kind of camera. Preferably, the camera is equipped with a GPS module, which provides approximate GPS coordinates for determining the location of parking spots. Further, in some embodiments, the camera's GPS module may provide information regarding parking restrictions such as fire hydrants, etc. An operator may optionally utilize a portable audio recording device to capture audio and provide a description of the blockface. The combination of video data and operator description is helpful in accurately performing blockface forensics.

The parking spaces are numbered. In an embodiment, the spaces along the entire blockface can be indexed from 1 to the number of available spaces from left to right from the point of view of the opposite blockface. Under some conditions such as occlusions, differing time ranges of capture from multiple cameras, or due to distance from camera, some available parking spaces may be unmonitored by the camera. These spaces are also indexed and will ultimately be reported as unobserved for some time period. For un-demarcated spaces, the number of available spaces can be estimated from the length of the parking area. This requires an estimation of the length of a car. One good estimation is 20 feet/car, but other estimations may also be used. Alternatively, for un-demarcated spaces, an estimate can be formed by analyzing video of the blockface with cars that are typically parked in the un-demarcated region during full or near full occupancy.

It is noteworthy that in many cases, each camera views only a section of a blockface. Therefore, once the available parking spaces have been numbered, the video of each camera is examined and the parking spots observed by each camera are noted.

Figure 8:
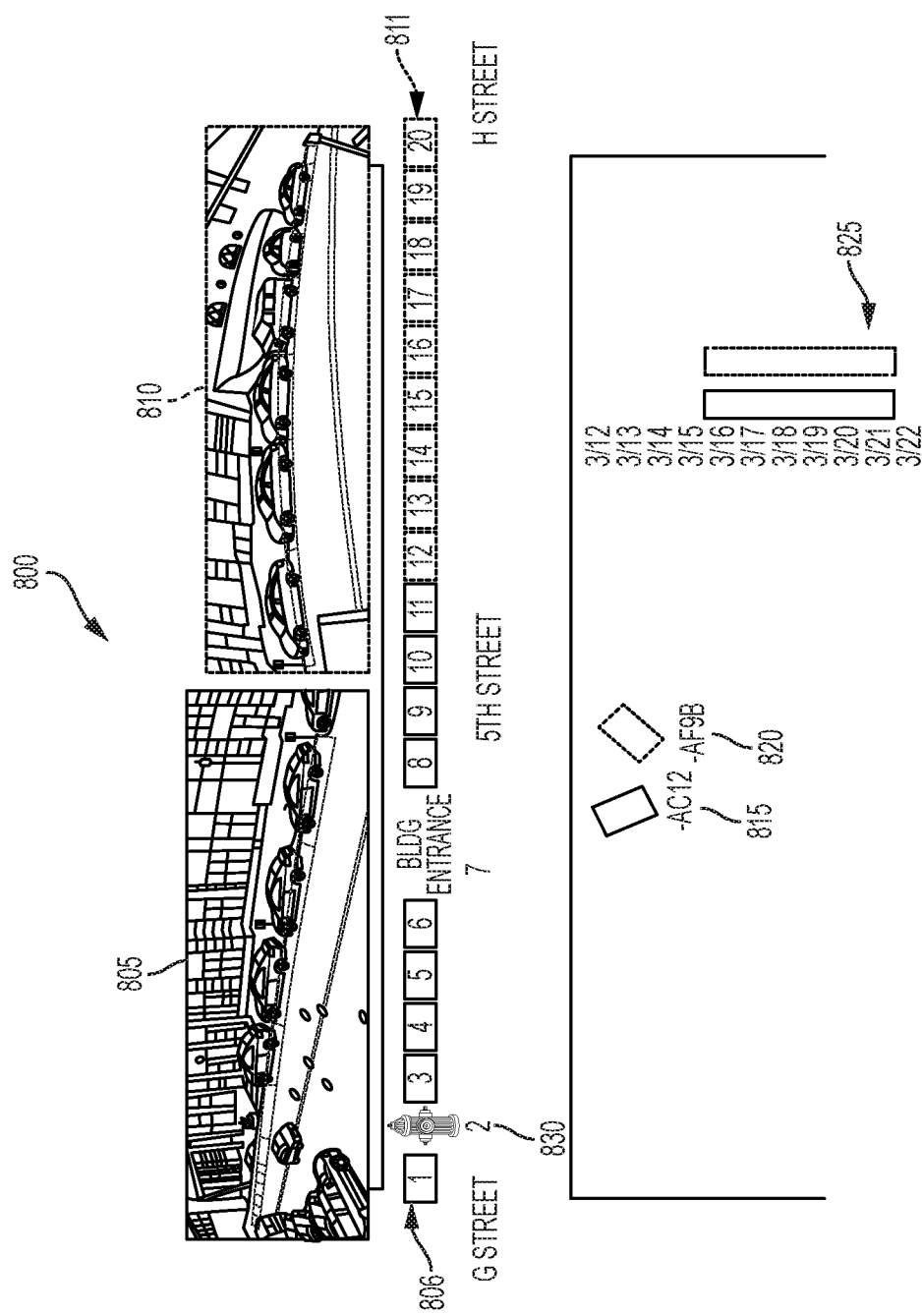
FIG. 8 depicts an exemplary diagram of the parking area associated with a blockface in accordance with the disclosed embodiments.

Once a comprehensive understanding of the parking area associated with the blockface is achieved, the information can be transcribed to a diagram of the blockface. An example of such a diagram 800 is illustrated in FIG. 8.

The diagram 800 contains the view 805 and 810 from each of two different cameras 815 and 820. The available parking spaces and where they lie along the blockface are shown according to the regions of the blockface as shown by boxes 806 and boxes 811. The location of the blockface and the respective location of cameras 815 and 820 is also illustrated in the diagram 800. A chart 825 of the days over which video was captured from each camera can be included. Overlapping camera views can be denoted as such. Unavailable parking spaces such as that due to the fire hydrant 830 may also be illustrated in diagram 800.

It is noteworthy that the rightmost car captured by the camera 815 is the same as the leftmost car captured by camera 820. This is indicative of the need for accurate relative positions across camera views captured in this step to ensure proper merging of results across camera views. In general, parking spots may be observed by more than a single camera and the algorithm for capturing the occupancy is discussed in the merge step of the workflow.

At step 430, drift correction can be performed to compensate for camera motion. Commonly the drift correction is necessary to remove motion in the scene introduced by motion of the mast caused by wind and thermal expansion and contraction. Other factors may also result in camera shift. Such frame motion degrades the performance, of the occupancy algorithm. Accordingly, a reference frame can be chosen, and an offset in the horizontal and vertical direction can be determined between each test frame and the reference frame. The process we implemented for this workflow is similar to techniques used in image registration, video stabilization, etc.

Figure 12:
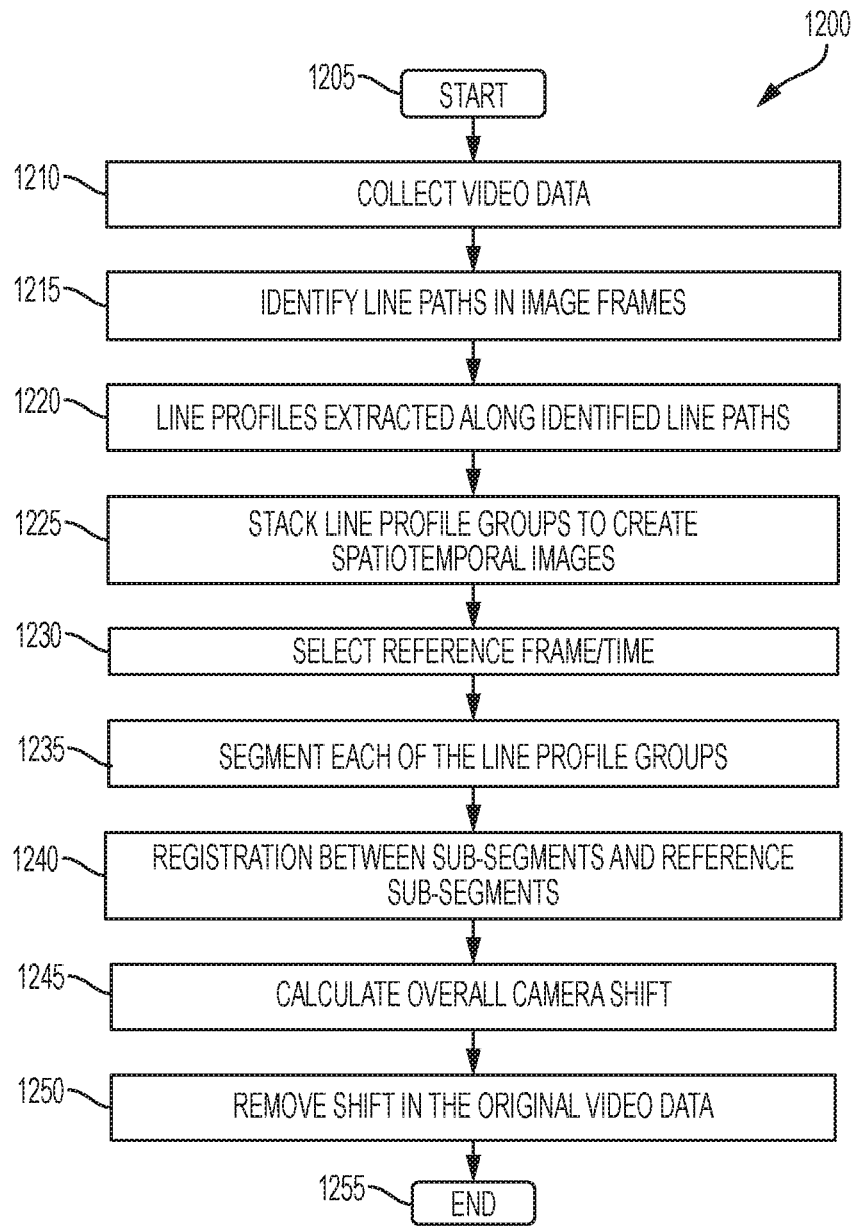
FIG. 12 depicts a method for camera shift correction in accordance with aspects of the disclosed embodiments.

FIG. 12 illustrates one method 1200 for camera shift correction that is robust to scene dynamics and is computationally fast. It should be understood that method 1200 represents one possible camera shift correction method and that other shift correction methods might alternatively or additionally be used. The method begins at block 1205.

A line path can be defined as a contiguous set of pixels that connect two endpoint pixels in an image. Line paths may be horizontal, vertical, diagonal, curved, etc., depending on the positions of the two endpoints and the collection of pixels that connect them. A line profile is defined as the sequence of image pixel values in sequence sampled from the beginning pixel of a line path to the end pixel of a line path. An image with multiple color channels can be converted to a single channel image using techniques such as a red, green, blue to gray transformation. A line profile group is defined as a set of line profiles extracted from line paths that traverse the image in a similar direction. A line profile group segment is a section of a line profile group.

At block 1210, a temporal sequence of image frames (i.e., video sequence) can be collected or acquired. At block 1215, multiple line paths in the image frames can be identified. The line paths may be selected to be horizontal, vertical, diagonal, curved, etc., depending on the specific application. The line paths are used as guides for the extraction of line profiles along the lines, as shown at block 1220.

Block 1225 illustrates an optional step wherein the line profile groups from desired frames are stacked in order to form one or more spatiotemporal images. Next at block 1230, a reference frame/time can be selected. The selection of a reference frame or time can be accomplished in a number of different ways as disclosed herein.

Once the reference frame has been established, each of the identified line profiles groups can be segmented into multiple sub-segments, as illustrated at block 1235. Segmentation, as described in block 1235, is not strictly required in the method 1200, but will provide more robust alignment in some applications. Alignment and registration between the sub-segments from the desired frame/time and the corresponding sub-segments from the selected reference frame/time is required, as shown by block 1240. At this point, a translation of each of the frames of video is completed so that the overall camera shift information can be calculated from the registration information between all segments, as illustrated at block 1245. The obtained drift information is thus applied to the original sequence of image frames or video to remove the shift in the data, as shown at block 1250. The method 1200 then ends at block 1255.

Next at step 435, a region of interest can be selected for each parking spot based on the blockface forensics. Regions of interest (ROIs) for each parking spot can be determined and marked using the forensic data and/or diagram 800 from step 425. The selected ROI and associated information can be provided to a computer vision based parked vehicle detection module to determine individual stall occupancy.

Figure 9:
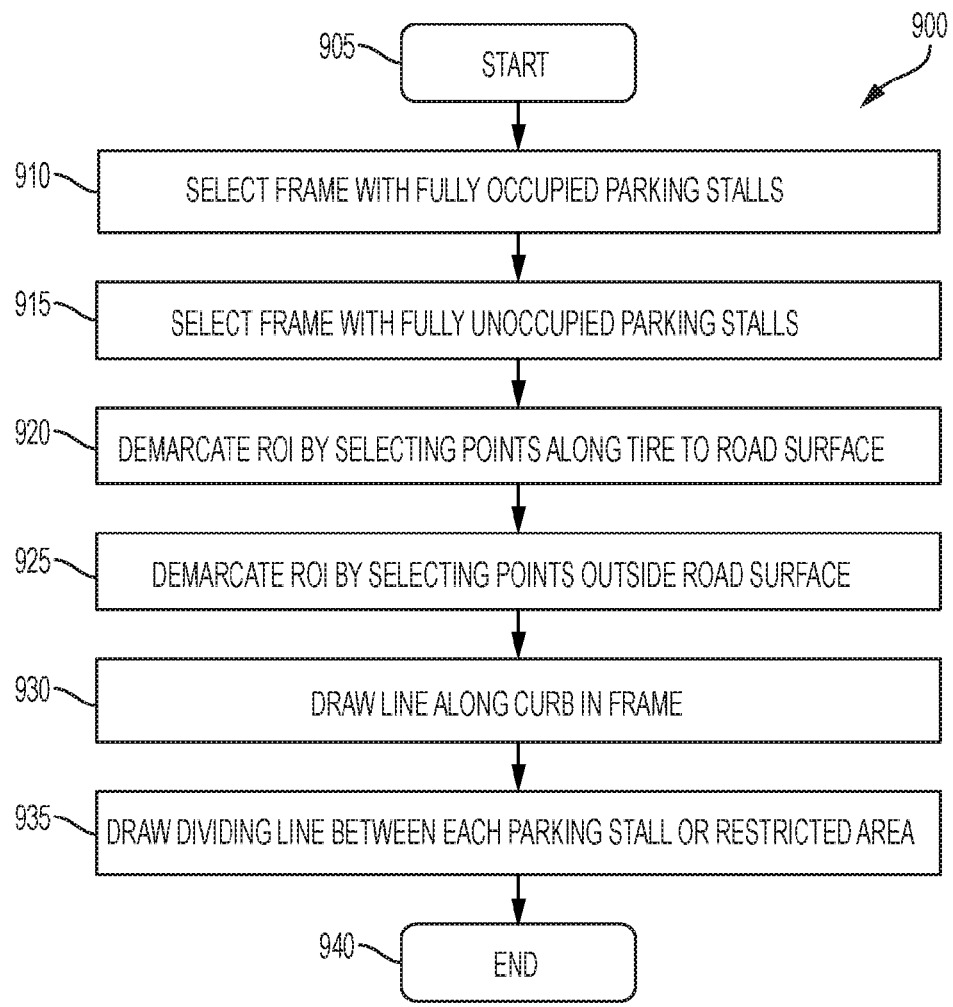
FIG. 9 depicts a flow chart illustrating steps for selecting a region of interest in accordance with the disclosed embodiments.

A method 900 for ROI selection is illustrated in FIG. 9. The method begins at step 905. First, a video frame with fully occupied parking stalls is selected as shown at step 910. If a fully occupied frame does not exist, then a frame with high occupancy is selected, where the stalls of a fully occupied blockface can be inferred from the image. Next, a video frame with fully unoccupied parking stalls is selected as shown at step 915. If a fully unoccupied frame does not exist, then a frame with a low occupancy is selected, where the position of the curb along the blockface can be inferred from the image.

An ROI is defined as a polygon that encompasses the region of a captured video where the cars are parked. Although the ROI, in general, may require many points to define its location, it is dominated by two long line paths and two short line paths. One long line path of the ROI is demarcated, in step 920, by selecting points along the road surface that are as close to the curb as possible yet encompass the parked cars. This line path is typically identified by the tire positions in each parked vehicle along the road surface in the frame selected from the video frame in step 910.

Another long line path of the ROI is demarcated in step 925 by selecting points outside of the road surface that are as close to the curb as possible yet encompasses the parked cars. This line path is typically identified by the roofs of the vehicles in the parking area. A third line path, which is internal to the ROI, is drawn along the curb in step 930, using the frame selected in step 915. When the line paths of steps 920, 925, and 930 comprise of a series of line segments, a curve may be fit to these points. The ROI for the parking area has now been identified. A dividing line can be drawn between each parking stall or restricted parking area as shown at step 935. The method ends at step 940.

In some embodiments, if the environment allows, traffic cone(s) can be used as temporary demarcations of the parking spots for the ROI selection step 435. In another embodiment, when the parking zones are demarcated, for example, with lines on the street, automated methods can be used to locate the lines or marking and can be used for automated ROI selection.

The selected regions of interest are provided to a module to perform computer vision based parked vehicle detection on the video as shown at step 440. The computer vision based parked vehicle detection yields corresponding occupancy detection of those virtually marked stalls over time. Two primary embodiments include spatiotemporal vehicle detection and machine-learning based vehicle detection, for extracting parking occupancy data from the video.

The output from both such techniques is a time-series of occupancy probabilities for those individual spots identified by the ROI in the previous step. The occupancy probability can be further converted into a binary number indicating the spaces are occupied or vacant using a basic thresholding technique. Additionally and optionally, the final or intermediate results from both the spatiotemporal vehicle detection embodiment and the machine-learning based vehicle detection embodiment may be fused to improve the performance in accuracy, computation speed, etc.

Many existing machine learning based vehicle detection methods can be applied for yielding corresponding occupancy detection in the ROI. In one embodiment, the machine learning technique proceeds as follows: first, the region of interest, which in general comprises two long sides (which may be curved) and two short sides, is converted into a rectangular shape using an image de-warping technique (e.g., inverse of the combined transformation from quadratic fitting & perspective transformation). A rectangular window (of potentially various sizes) is swept over the transformed region of interest. For each position of the window, a set of features associated with the window is calculated. These features may be a set of features derived from a Histogram of Oriented Gradients (HOG), but other features may be used. These features form a point in a multidimensional space. From a previously trained classifier based on ground truth positive images and background negative images, regions of this multidimensional space associated with occupied spaces and with vacant spaces are identified, and these regions are separated from a decision boundary. By passing the feature extracted from each window through the previously trained classifier, a score indicating the confidence that the given window represents a vehicle is yielded.

A technique often known as non-maximal suppression can be used to identify the most likely windows (their corresponding positions and sizes) occupied by vehicles. Next, a probability of occupancy is determined based on the fraction of the overlap between identified vehicle windows and each stall region.

For example, if an identified vehicle window overlapped with stall #3 by 10% and with stall #4 by 60%, then we conclude that the probability of occupancy of stall #3 is 0.1 and the probability of occupancy of stall #4 is 0.6. Note that a vehicle is usually smaller than a stall, therefore thresholding and normalization may be applied in addition. Such methods are described herein.

A spatiotemporal technique proceeds as follows. First, one or more line paths internal to the ROI and run in the same direction of the long edges, of the ROI are identified. A line profile along each of these line paths is constructed from the pixel intensity along the line path. Each line profile is scaled spatially so that the number of elements of each line profile is equal to other line profiles. The corresponding elements for the set of line profiles are transformed to create a set of transformed line profiles. In one embodiment, the transformation uses a red, green, blue to hue, saturation, value transformation. Other transformations are also possible such as using the principal components. Next, a subset of the transformed line profiles are set to zero. An inverse transformation is applied to produce filtered line profiles. Following this step, the Euclidean distance of the corresponding elements of the filtered line profiles to the mean of the elements of the filtered line profiles is identified which is defined as a structure metric. The integrated area under the region of the structure metric corresponding to each stall is calculated. From a previously trained classifier based on ground truth images, the magnitude of the integrated structure metric is converted to a probability of occupancy.

The probability of occupancy can be converted to an indicator of occupied vs. vacant for each parking stall based on setting a threshold value for the probability of occupancy. If the probability exceeds the threshold value, the stall is identified as occupied, and if the probability is less than the threshold value, the stall is identified as vacant. If a set of ground truth results is available, then the threshold value can be determined by setting the number of spots incorrectly classified as vacant when they are truly occupied as equal to the number of spots incorrectly classified as occupied when they are truly vacant.

The machine learning algorithm and the spatiotemporal algorithm can both be applied to the same images, resulting in respective estimates of the occupation probability. The results of each algorithm can be fused to provide a single estimate of the occupation probability. One fusion technique consists of assigning a weight to the machine learning technique and another weight to the spatiotemporal technique, where these weights add to one. The sum of the machine learning algorithm occupancy probability multiplied by its weight and the spatiotemporal algorithm multiplied by its weights becomes the fused estimate of the occupancy probability. Other fusing techniques can also be used.

At step 445, the occupancy results from multiple cameras can be merged. In step 445, the time-series of occupancy probabilities and/or binaries from multiple cameras determined in step 440 are merged to estimate occupancy of the blockface.

In some cases, spaces along the blockface may go unobserved. Unobserved spaces along the blockface can be flagged with a special number, such as −1. In an embodiment, the merging process is a straightforward concatenation of the various views provided all the camera views are non-overlapped and the recordings are fully synchronized. However, it is often necessary to align the separate video data in time in order to align the timestamps across multiple cameras.

Specifically, if occupancy results are being measured at time T, the analyzed frame closest to T is used to estimate the occupancy. Whenever multiple cameras are viewing the same parking spot, the occupancy confidence from the view with better resolution on the overlapped stall(s) can be used.

Alternatively, the occupancy confidences observed from each camera can be averaged together.

Step 450 illustrates the optional performance of ground truth measurement techniques to collect the true occupancy information. This data is sometimes needed to optimize the computer vision algorithm parameters.

In optional step 450, a subset of video frames may be extracted and labeled by a human operator that provide ground truth measurement of the actual occupancy of the blockface over time. At the current stage of technology and imaging resolution, human labeling is still more accurate and less affected by various noises and environmental challenges. However, human labeling is also expensive and does not scale for large deployment. Thus, human ground truth measurement may be provided as auxiliary information for the automated computer vision methods of step 440. As mentioned earlier, various sampling schemes may be applied in conducting ground truth measurement.

In certain embodiments, the ground truth data can be used for generating Receiver operating characteristic (ROC) for the detection methods and determining the optimal thresholds for converting occupancy probability to binary decision (e.g., finding the point where the rate of false-positives equals the rate of false-negatives). The ground truth data can be used to identify failure modes in the detection algorithms if unexpected poor accuracy is found. The ground truth data can also be used to re-train classifiers and fine-tune the parameters in the detection algorithms.

Figure 10:
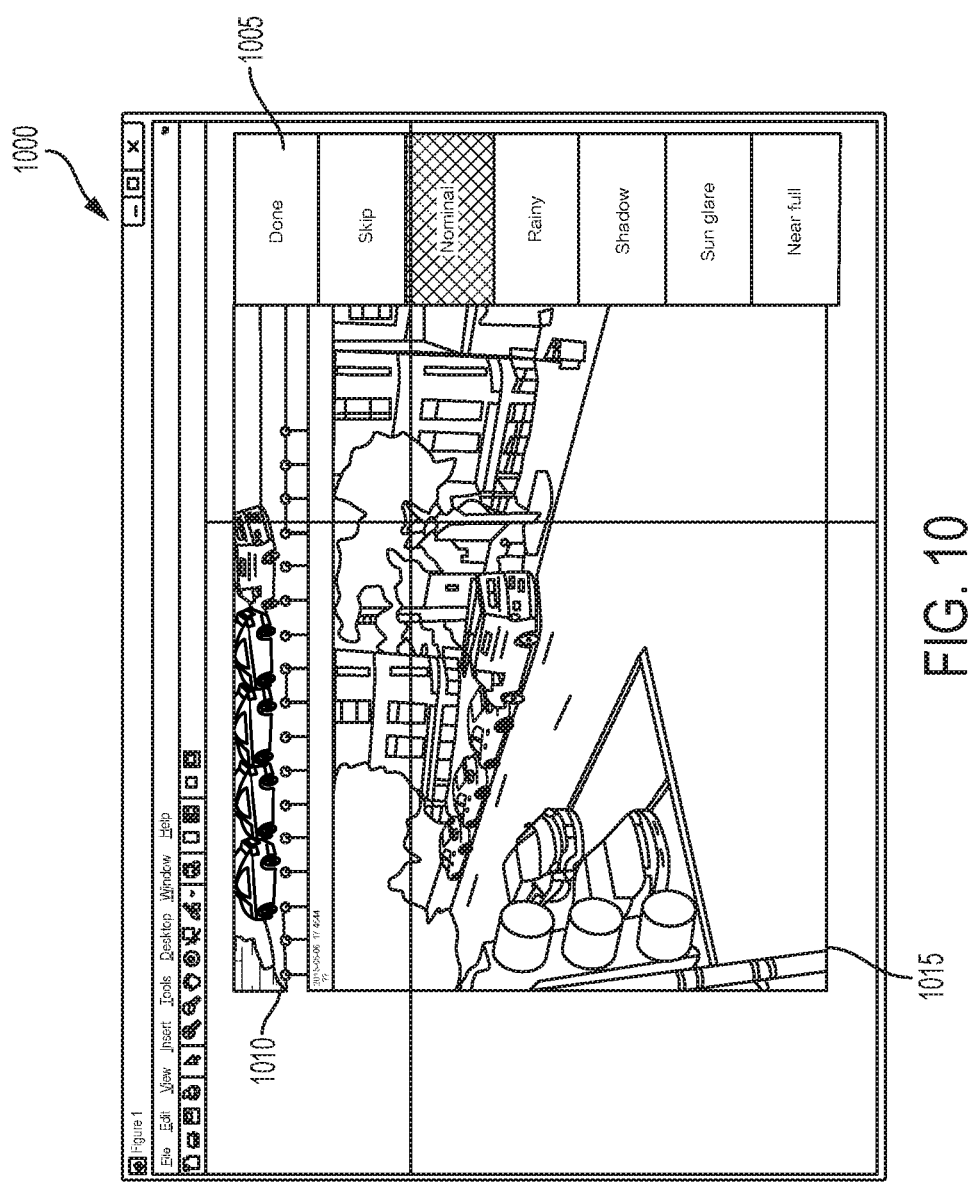
FIG. 10 depicts a GUI-based tool to expedite ground truth data collection accordance with the disclosed embodiments.

Additionally, since human labeling can be an expensive process, a GUI-based (Graphical User Interface) tool to expedite the step can be provided. FIG. 10 illustrates an exemplary snapshot 1000 of such a GUI. First, the GUI re-uses the ROI defined in step 435 to enable quick manual ground-truth indications. For each frame, the GUI operator can click anywhere that vertically aligns with a parking spot to indicate "occupied". For better spatial resolution, each stall can be sub-divided by a fraction (for example, one half or other such fraction).

Toggling is provided such that the labeling of all stalls is pre-set to be the same as the frame/image just preceding the current frame. If the occupancy of the full view remains the same, the operator can simply click "done" 1005, which verifies the ground truth for the current frame and advances to the next frame. If changes, are necessary, the operator can click on places where occupancy states changed (i.e., toggle those states). This greatly improves the efficiency of human labeling.

The GUI further includes an automated frame-to-frame similarity method to assess whether the occupancy of the blockface has changed. If not, human labeling will be skipped for those frames. By applying a tight specification on this similarity measurement, the efficiency of the ground truth determination is improved without sacrificing labeling accuracy.

The GUI can provide two views of the parking region: the original camera view 1015 and the normalized ROI view 1010. In most cases the operator is able to quickly determine the occupancy from the normalized ROI view 1010. When in doubt, the original view 1015 can also be examined. This improves the efficiency of the ground truth identification. Furthermore, since the operator of the GUI is looking at the same normalized ROI view 1010 that the machine-learning based method is, the human input helps to identify potential failure modes while performing the ground-truth labeling.

Note that instead of using the pre-defined virtual marks from the ROI selection of step 435 for the GUI, the GUI can be modified such that the operator can specify a start and an end of a vehicle rather than click/toggling the pre-defined bounding boxes. The remaining features of the GUI can stay the same (use previous label as starting points, toggle out previous vehicle, or add a new vehicle, etc.).

In step 455, the results of the blockface forensics and the occupancy results for each parking space can be reported to the proper authority. FIG. 11 illustrates an exemplary output 1100 providing the occupancy results for a blockface. A timestamp 1105 can be given in the first column. The parking occupancy can be reported on any desired time interval. In FIG. 11, the occupancy is provided once each minute. The number of available spaces can be included as in the parking spot index 1110 as a series of columns. In FIG. 11, 18 available spaces for the exemplary blockface were detected. Unobserved parking spots for a given time 1115 can be indicated in a different color and with a unique identifier.

Each cell can include the probability of occupancy indicative of the confidence that the parking spot was occupied at the given time. The classified occupancy based on a threshold can be displayed by setting the color of each cell dependent on if the spot is occupied or vacant. It should be appreciated that setting the color of each cell is equivalent to the binarization of the occupancy probability as described above. In the exemplary output in FIG. 11, a confidence threshold of 0.3 was chosen to classify the occupancy. Parking spots with a confidence metric above 0.3 were classified as occupied and were shown in red. Those with a confidence metric below 0.3 are classified as empty and are shown in blue.

Based on the foregoing, it can be appreciated that a number of embodiments, preferred and alternative, are disclosed herein. For example, in one embodiment, a method for parking occupancy detection comprises collecting video of a blockface with at least one video recording module; identifying a number of possible parking, spaces along the blockface in the collected video; defining a region of interest for each of the possible parking spaces; detecting a time dependent occupancy of the defined regions of interest for each of the possible parking spaces; and reporting the time dependent occupancy.

In an embodiment, the method further comprises identifying an optimal location for the at least one video recording module; configuring the at least one video recording module in the optimal location; and adjusting the at least one video recording module to optimally observe the blockface. In an embodiment, identifying a number of possible parking spaces along the blockface in the collected video further comprises indexing the possible parking spaces along the blockface.

In another embodiment, the method comprises performing drift correction on the collected video of the blockface. Defining a region of interest for each of the possible parking spaces further comprises introducing a line path in a street, parallel to a traffic flow and a selected distance from a curb, wherein the line path avoids parked vehicles and wherein the possible parking spaces are all occupied in the video frame; introducing a line path outside of the street, parallel to the traffic flow, and a selected distance from the curb, wherein the line path avoids parked vehicles and wherein the possible parking spaces are all occupied in the video frame; introducing a line path along the curb in a video frame wherein the possible parking spaces are substantially unoccupied in the video frame; and introducing a dividing line between each of the possible parking spaces.

In another embodiment, detecting occupancy of the defined regions of interest for each or the possible parking spaces further comprises performing an image-based parked vehicle detection comprising at least one of a spatiotemporal vehicle detection and a computer vision based vehicle detection. The method may further comprise fusing the image-based parked vehicle detection comprising the spatiotemporal vehicle detection and the image-based parked vehicle detection comprising the computer vision based vehicle detection.

In another embodiment, collecting video of a blockface with at least one video recording module comprises collecting video with a plurality of video recording modules, the method further comprising merging the time dependent detected occupancy of the defined regions of interest for each or the possible parking spaces provided from each of the plurality of video recording modules.

In another embodiment, the method further comprises performing a ground truth detection in order to collect a true occupancy of the possible parking spaces.

In yet another embodiment, a system for parking occupancy detection comprises a video recording module configured to collect image data of a blockface; a processor; and a computer-usable medium embodying computer code, the computer-usable medium being coupled to the processor, the computer code comprising non-transitory instruction media executable by the processor configured for identifying a number of possible parking spaces along the blockface in the collected video, defining a region of interest for each of the possible parking spaces, detecting a time dependent occupancy of the defined regions of interest for each of the possible parking spaces, and reporting the time dependent occupancy.

In an embodiment, the video recording module further comprises a video recorder affixed to a video trailer, the video trailer comprising a vertically extending mast configured to hold the video recorder and a power source for powering the video recorder.

In another embodiment, identifying a number of possible parking spaces along the blockface in the collected video further comprises indexing the possible parking spaces along the blockface. In an embodiment, the computer code comprising non-transitory instruction media executable by the processor is further configured for performing drift correction on the collected video of the blockface.

In an embodiment, defining a region of interest for each of the possible parking spaces further comprises introducing a line path, in a street, parallel to a traffic flow and a selected distance from a curb, wherein the line path avoids parked vehicles and wherein the possible parking spaces are all occupied in the video frame; introducing a line path outside of the street, parallel to the traffic flow and a selected distance from the curb, wherein the line path avoids parked vehicles and wherein the possible parking spaces are all occupied in the video frame; introducing a line path along the curb in a video frame wherein the possible parking spaces are substantially unoccupied in the video frame; and introducing a dividing line between each of the possible parking spaces.

In another embodiment, detecting occupancy of the defined regions of interest for each of the possible parking spaces further comprises performing an image-based parked vehicle detection comprising at least one of a spatiotemporal vehicle detection and a computer vision based vehicle detection; and fusing the image-based parked vehicle detection comprising the spatiotemporal vehicle detection and the image-based parked vehicle detection comprising the computer vision based vehicle detection.

In another embodiment, collecting video of a blockface with at least one video recording module comprises collecting video with a plurality of video recording modules, the method further comprising merging the time dependent detected occupancy of the defined regions of interest for each of the possible parking spaces provided from each of the plurality of video recording modules.

In another embodiment, computer code comprising non-transitory instruction media executable by the processor is further configured for providing a ground truth module comprising a graphical user interface for performing a ground truth detection in order to collect a true occupancy of the possible parking spaces.

In yet another embodiment, a method for parking occupancy detection comprises identifying an optimal location for the at least one video recording module; configuring the at least one video recording module in the optimal location; adjusting the at least one video recording module to optimally observe the blockface; indexing the possible parking spaces along the blockface; collecting video of a blockface with at least one video recording module; identifying a number of possible parking spaces along the blockface in the collected video; defining a region of interest for each of the possible parking spaces; detecting a time dependent occupancy of the defined regions of interest for each of the possible parking spaces; performing a ground truth detection in order to collect a true occupancy of the possible parking spaces; merging the time dependent occupancies from the multiple cameras observing each blockface; and reporting the time dependent occupancy.

In an embodiment, the method further comprises performing drift correction on the collected video of the blockface performing an image-based parked vehicle detection comprising at least one of a spatiotemporal vehicle detection and a computer vision based vehicle detection; and fusing the image-based parked vehicle detection comprising the spatiotemporal vehicle detection and the image-based parked vehicle detection comprising the computer vision based vehicle detection.

In another embodiment, defining a region of interest for each of the possible parking spaces further comprises introducing a line path in a street, parallel to a traffic flow and a selected distance from a curb, wherein the line path avoids parked vehicles and wherein the possible parking spaces are all occupied in the video frame; introducing a line path outside of the street, parallel to the traffic flow and a selected distance from the curb, wherein the line path avoids parked vehicles and wherein the possible parking spaces are all occupied in the video frame; introducing a line path along the curb in a video frame wherein the possible parking spaces are substantially unoccupied in the video frame; and introducing a dividing line between each of the possible parking spaces.

It will be appreciated that variations of the above-disclosed and other features and functions, or alternatives thereof, may be desirably combined into many other different systems or applications. It should also be understood that various presently unforeseen or unanticipated alternatives, modifications, variations or improvements therein may be subsequently made by those skilled in the art, which are also intended to be encompassed by the following claims.

What is claimed is:

1. A method for parking occupancy detection comprising: collecting video of a blockface with at least one video recording module; identifying a number of possible parking spaces along said blockface in said collected video; defining a region of interest for each of said possible parking spaces;

detecting a time dependent occupancy of said defined regions of interest for each of said possible parking spaces; and reporting said time dependent occupancy; wherein defining a region of interest for each of said possible parking spaces further comprises: introducing a line path in a street, parallel to a traffic flow and a selected distance from a curb, wherein said fine path avoids parked vehicles and wherein said possible parking spaces are all occupied in said video frame; introducing a Sine path outside of said street, parallel to said traffic flow and a selected distance from said curd, wherein said line path avoids parked vehicles and wherein said possible parking spaces are all occupied in said video frame; introducing a Sine path along said curb in a video frame wherein said possible parking spaces are substantially unoccupied in said video frame: and introducing a dividing line between each of said possible parking spaces.

2. The method of claim 1 further comprising:
identifying an optimal location for said at least one video recording module;
configuring said at least one video recording module in said optimal location; and
adjusting said at least one video recording module to optimally observe said blockface.

3. The method of claim 1 wherein identifying a number of possible parking spaces along said blockface in said collected video further comprises:
indexing said possible parking spaces along said blockface.

4. The method of claim 1 further comprising:
performing drift correction on said collected video of said blockface.

5. The method of claim 1 wherein detecting occupancy of said defined regions of interest for each of said possible parking spaces further comprises:
performing an image-based parked vehicle detection comprising at east one of:
a spatiotemporal vehicle detection; and
a computer vision based vehicle detection.

6. The method of claim 5 further comprising:
fusing said image-based parked vehicle detection comprising said spatiotemporal vehicle detection and said image-based parked vehicle detection comprising said computer vision based vehicle detection.

7. The method of claim 1 wherein collecting video of a blockface with at least one video recording module comprises collecting video with a plurality of video recording modules, said method further comprising:
merging said time dependent detected occupancy of said defined regions of interest for each of said possible parking spaces provided from each of said plurality of video recording modules.

8. The method of claim 1 further comprising:
performing a ground truth detection in order to collect a true occupancy of said possible parking spaces.

9. A system for parking occupancy detection comprising: a video recording module configured to collect image data of a blockface; a processor; and a computer-usable medium embodying computer code, said computer-usable medium being coupled to said processor, said computer code comprising non-transitory instruction media executable by said processor configured for: identifying a number of possible parking spaces along said blockface in said collected video; defining a region of interest for each of said possible parking spaces; detecting a time dependent occupancy of said defined regions of interest for each of said possible parking spaces; and reporting said time dependent occupancy; wherein defining a region of interest for each of said possible parking spaces further comprises: introducing a line path in a street, parallel to a traffic flow and a selected distance from a curb, wherein said line path avoids parked vehicles and wherein said possible parking spaces are all occupied in said video frame; introducing a line path outside of said street, parallel to said traffic flow and a selected distance from said curd, wherein said line path avoids parked vehicles and wherein said possible parking spaces are all occupied in said video frame; introducing a Sine path along said curb in a video frame wherein said possible parking spaces are substantially unoccupied in said video frame: and introducing a dividing line between each of said possible parking spaces.

10. The system of claim 9 wherein said video recording module further comprises:
a video recorder affixed to a video trailer said video trailer comprising:
a vertically extending mast configured to hold said video recorder; and
a power source for powering said video recorder.

11. The system of claim 9 wherein identifying a number of possible parking spaces along said blockface in said collected video further comprises:
indexing said possible parking spaces along said blockface.

12. The system of claim 9 wherein said computer code comprising non-transitory instruction media executable by said processor is further configured for:
performing drift correction on said collected video of said blockface.

13. The system of claim 9 wherein detecting occupancy of said defined regions of interest for each of said possible parking spaces further comprises:
performing an image-based parked vehicle detection comprising at east one of:
a spatiotemporal vehicle detection; and
a computer vision based vehicle detection; and
fusing said image-based parked vehicle detection comprising said spatiotemporal vehicle detection and said image-based parked vehicle detection comprising said computer vision based vehicle detection.

14. The system of claim 9 wherein collecting video of a blockface with at least one video recording module comprises collecting video with a plurality of video recording modules, said method further comprising:
merging said time dependent detected occupancy of said defined regions of interest for each of said possible parking spaces provided from each of said plurality of video recording modules.

15. The system of claim 9 wherein said computer code comprising non-transitory instruction media executable by said processor is further configured for:
providing a ground truth module comprising a graphical user interface for performing a ground truth detection in order to collect a true occupancy of said possible parking spaces.

16. A method for parking occupancy detection comprising:
identifying an optimal location for at least one video recording module;
configuring said at least one video recording module in said optimal location;
adjusting said at least one video recording module to optimally observe said blockface;
indexing said possible parking spaces along said blockface;

collecting video of a blockface with at least one video recording module;
identifying a number of possible parking spaces along said blockface in said collected video;
defining a region of interest for each of said possible parking spaces wherein defining a region of interest further comprises:
  introducing a line path in a street, parallel to a traffic flow and a selected distance from a curb, wherein said line path avoids parked vehicles and wherein said possible parking spaces are all occupied in said video frame;
  introducing a line path outside of said street, parallel to said traffic flow and a selected distance from said curb, wherein said line path avoids parked vehicles and wherein said possible parking spaces are all occupied in said video frame;
  introducing a line path along said curb in a video frame wherein said possible parking spaces are substantially unoccupied in said video frame; and
introducing a dividing line between each of said possible parking spaces;
detecting a time dependent occupancy of said defined regions of interest for each of said possible parking spaces;
performing a ground truth detection in order to collect a true occupancy of said possible parking spaces;
merging the time dependent occupancies from the multiple cameras observing each blockface; and
reporting said time dependent occupancy.

17. The method of claim 16 further comprising:
performing drift correction on said collected video of said blockface;
performing an image-based parked vehicle detection comprising at least one of:
  a spatiotemporal vehicle detection; and
  a computer vision based vehicle detection; and
fusing said image-based parked vehicle detection comprising said spatiotemporal vehicle detection and said image-based parked vehicle detection comprising said computer vision based vehicle detection.

18. The method of claim 16 wherein defining a region of interest for each of said possible parking spaces further comprises:
  introducing a line path in a street, parallel to a traffic flow and a selected distance from a curb, wherein said line path avoids parked vehicles and wherein said possible parking spaces are all occupied in said video frame;
  introducing a line path outside of said street, parallel to said traffic flow and a selected distance from said curb, wherein said line path avoids parked vehicles and wherein said possible parking spaces are all occupied in said video frame;
  introducing a line path along, said curb in a video frame wherein said possible parking spaces are substantially unoccupied in said video frame; and
  introducing a dividing line between each of said possible parking spaces.

* * * * *